MAGNETIC CORE ASSEMBLIES

Filed Dec. 5, 1961 3 Sheets-Sheet 1

INVENTOR.
MICHAEL M. STERN
BY F. D. Sullivan
ATTORNEY

Nov. 3, 1964 M. M. STERN 3,155,948
MAGNETIC CORE ASSEMBLIES
Filed Dec. 5, 1961 3 Sheets-Sheet 2

INVENTOR.
MICHAEL M. STERN
BY F L Sullivan
ATTORNEY

Nov. 3, 1964 M. M. STERN 3,155,948

MAGNETIC CORE ASSEMBLIES

Filed Dec. 5, 1961 3 Sheets-Sheet 3

INVENTOR.
MICHAEL M. STERN
BY F. L. Sullivan
ATTORNEY

United States Patent Office 3,155,948
Patented Nov. 3, 1964

3,155,948

MAGNETIC CORE ASSEMBLIES

Michael M. Stern, Brookline, Mass., assignor to Sylvania Electric Products Inc., a corporation of Delaware Filed Dec. 5, 1961, Ser. No. 157,622
5 Claims. (Cl. 340—174)

Figure 1:
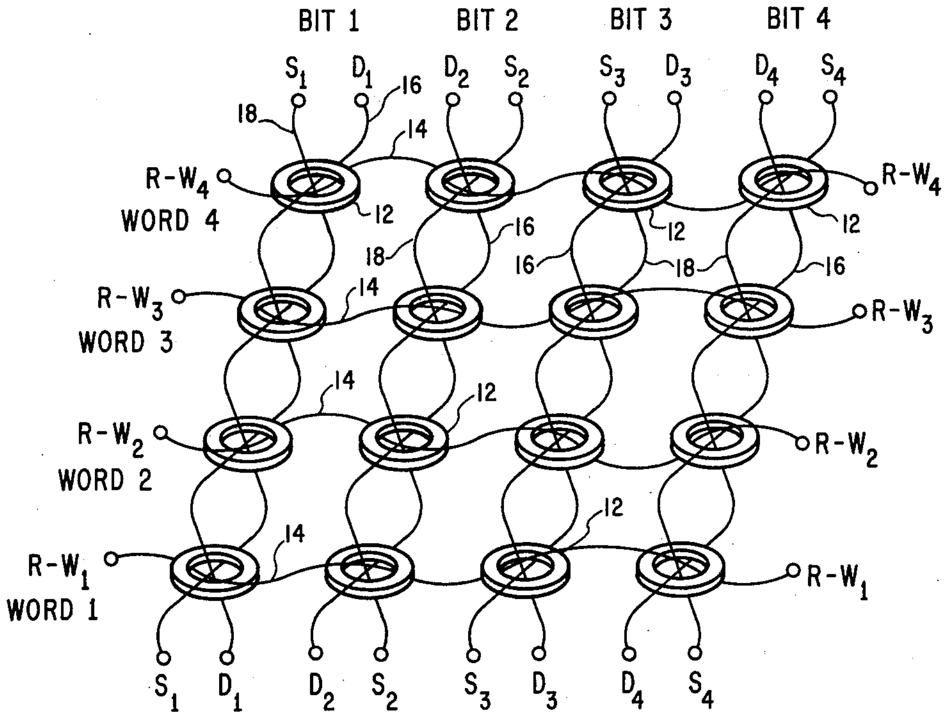

This invention is concerned with electronic data processing equipment and particularly with improvements in fabrication techniques for magnetic core memory and switching planes useful in such equipment.

At an early point in the development of the electronic digital computer, J. W. Forester, in an article entitled, "Digital Information Storage in Three Dimensions Using Magnetic Cores," Journal of Applied Physics (vol. 22, page 44, January 1951), discussed the possibility of utilizing the rectangular hysteresis loop characteristics of certain magnetic materials to store binary information. Further developments have improved this concept to the extent that most digital data-processing memories now comprise a plurality of ferrite torodial cores, with rectangular hysteresis-loop characteristics, connected in a matrix arrangement. When an individual core of the matrix is pulsed by a current of a certain polarity and of sufficient magnitude, its residual magnetic flux is set in one direction, where it remains until it is reversed by a pulse of opposite polarity.

The aforementioned basic concepts are presently used in two principal types of magnetic core memories and switching systems. The first is the coincident-current type, wherein a matrix of cores is formed on a plane, the total number of cores being equal to the total number of words capable of being stored. Usually these matrix planes are formed in a square configuration, so that along each side there are a number of cores equal to the square root of the total number of digital words capable of being stored. An array of these planes is formed by stacking several with the total number of planes equal to the number of bits per digital word.

These coincident-current core arrays are operated by pulsing a horizontal wire interconnecting all cores in each row in each plane and simultaneously pulsing a vertical wire interconnecting all cores in each column of each plane, both wires passing through the cores in the same direction. This coincident-current stimulation of the cores, at the intersection of the column and row wires pulsed, causes a binary one to be written into particular cores. A binary zero is imposed on a particular core by pulsing, in the same direction as for a binary one, the row and column conductors intersecting at the core. A Z-winding is provided in the coincident-current scheme, so that if pulsed coincidentally with the row and column conductors, but in the opposite direction, the Z-winding inhibits switching of the core, thereby writing a binary zero.

The cores in a coincident-current memory plane are affixed, on edge, to a base material, such as a phenolic board. Since they are toroid-shaped, they are arranged so that their central openings are diagonally disposed in the horizontal and vertical direction of their respective planes. Consequently, conductors interconnecting cores may be threaded, usually manually, along either a row or column and pass through the central opening of a line of cores. Z-windings are provided in vertical columns in each plane alternately in one direction and then the other in adjacent columns.

A read operation is performed in the coincident-current memory array, described above, by pulsing a horizontal row conductor and a vertical column conductor, whose intersection is at the cores to be read. The read information is translated from the memory by a sense winding, which is wound in diagonal rows, alternately in one direction and then the other in every second diagonal row in the square matrix. The sense winding is then continued in every second diagonal column, first in one direction and then the other to cancel the half selected noise from the cores.

Planes in each array are interconnected at one of the four sides of the square plane by the horizontal windings and at a second side by the vertical windings.

The second type of magnetic core switching plane is typified by the so-called linear-selection type memory, wherein a matrix of cores is formed on a plane in which they are arranged so that the columns are as many cores long as the word capacity of the plane and the rows are as many cores wide as there are bits in the data words to be stored; or, in other words, each row in the plane represents a digital word and the number of columns determines the number of bits in these words. For example, if a 4096 word memory capacity is contemplated, with 38 bits per word, the dimensions of the matrix, in number of cores, are 4096 by 38, which might be arranged in 64 planes each having 64 rows and 38 columns of cores. The 38 cores in each of the resulting 4096 rows are connected by a common read-write winding, which is manually threaded through each core in the row. The 4096 cores in each of the 38 columns are similarly connected by one sense and one digit conductor threaded through all of the cores representing a corresponding digit in each word.

A write operation is performed in a linear-selection memory matrix by pulsing a read-write winding in one direction and simultaneously pulsing a digit winding in the same direction. One digit conductor is provided for each bit in the normal word, so that as many digit windings could be pulsed simultaneously with a particular read-write winding as there are bits in the word. The read-write windings, when pulsed, half switch all the bit-storing cores in the row, so that when coincidence of pulsing of digit and read-write windings occurs at a particular core in the row, full switching will be accomplished and a binary one will be stored. The lack of a current pulse on the digit-winding for a particular bit in the word presents full switching and thus provides a binary-zero storage in that bit.

Reading in a linear-selection memory is accomplished by pulsing the read-write conductor in the opposite direction from which it was pulsed for the write operation, thereby allowing all bits of one word stored in a particular row to be carried to the output by their respective sense windings.

Fabrication of a linear-selection type core memory is conventionally accomplished by hand-threading the read-write, sense and digit windings similar to the way in which the coincident-current type memory is formed. If, however, the linear-selection type memory could be formed by attaching in an appropriate manner the cores in a matrix arrangement with the toroids lying on the base board, flat on their faces, winding could then occur, (see FIG. 1) both in rows and columns, in an undulating pattern by alternately threading from the bottom of the core at the base board up through the hole of the toroid-shape, and then down through the hole in the next core in the row or column, up through the hole of the next core etc. This undulating pattern should provide that read-write and digit windings in the same core thread through the hole in the same direction thereby causing write and digit currents to add. The sense winding threads in the opposite direction. During the read process the read-write winding is pulsed in the opposite direction from its operation during the write cycle and the current or stimulation from the winding threads the core in the same direction as the output polarity in the sense windings.

This method of threading a linear-selection memory matrix is obviously cumbersome when done by hand and is subject to errors and non-uniformities which cause severe troubles in memory matrices because they are so sensitive to stray capacitance, inductance and noises due merely to configuration of their wiring. Core threading could be accomplished by machine, but existing threading or knitting-type machines are not capable of handling relatively non-flexible wire (in contrast with yarn and thread). Also, ferrite cores, due to existing manufacturing techniques have sharp edges which can sever the wires or strip insulation when cores are affixed to base boards on their faces.

Accordingly, a primary object of the present invention is to provide an improved structure for magnetic core planar arrays and more specifically, an improved method for fabricating the core and wiring interconnection scheme for a linear-selection magnetic-core memory system. A further object is to provide a linear-selection memory matrix, wherein hand-wiring is eliminated and printed-circuit methods are provided for insuring improved reliability and uniformity and a minimum of necessary manual effort for fabrication.

These and related objects are accomplished in one preferred embodiment of the invention which features a first printed-circuit board having pins perpendicularly affixed thereto in the rows and columns of a matrix arrangement, said pins each being divided into three conducting segments separated by non-conductive materials; and, a second printed-circuit board having holes provided therein in a corresponding matrix arrangement. The tops of the pins on the first printed-circuit board are bevelled, and the holes in the second printed-circuit board are similarly bevelled for locking to the pins after they have been encircled by toroid-shaped cores. The drive, sense, etc. windings of the cores are etched upon the boards and connected to the conductive segments on the pins.

Figure 2B:
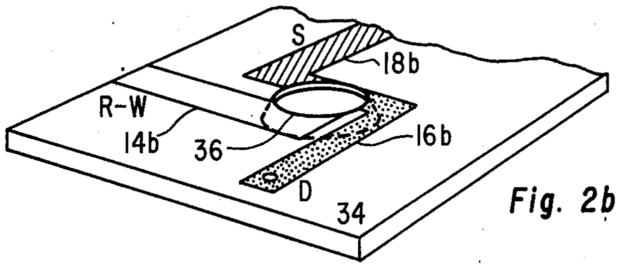
Figure 2A:
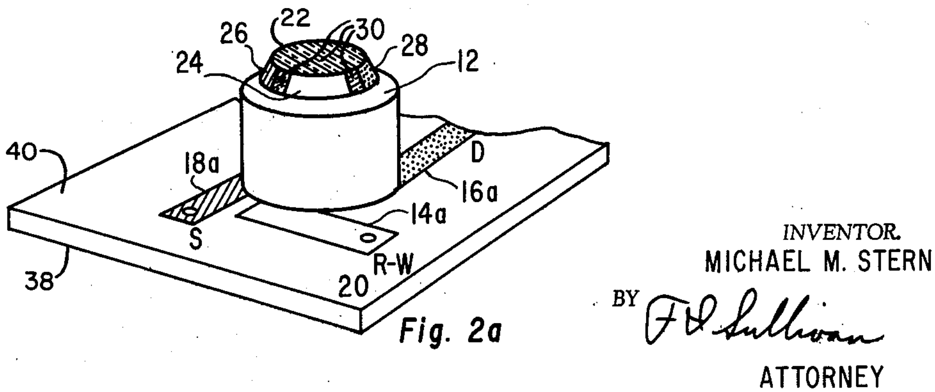
Figure 3:
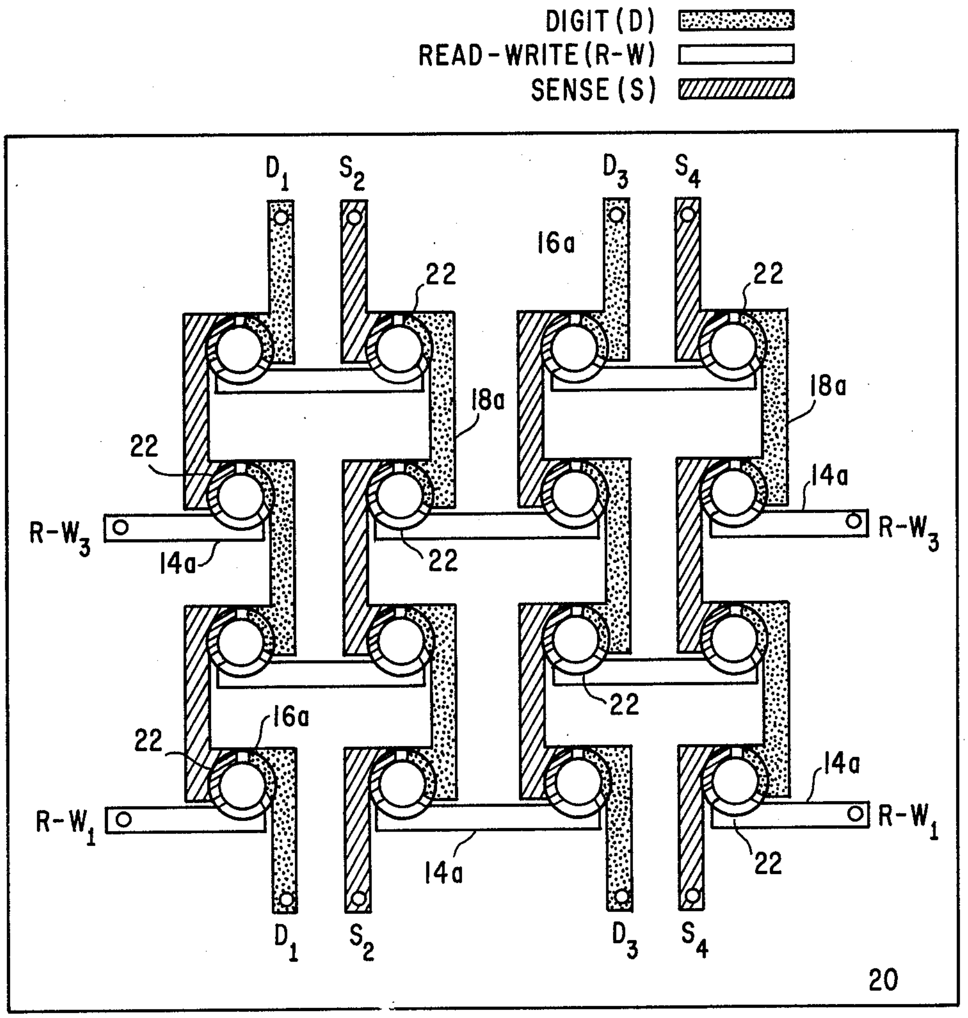
Figure 4:
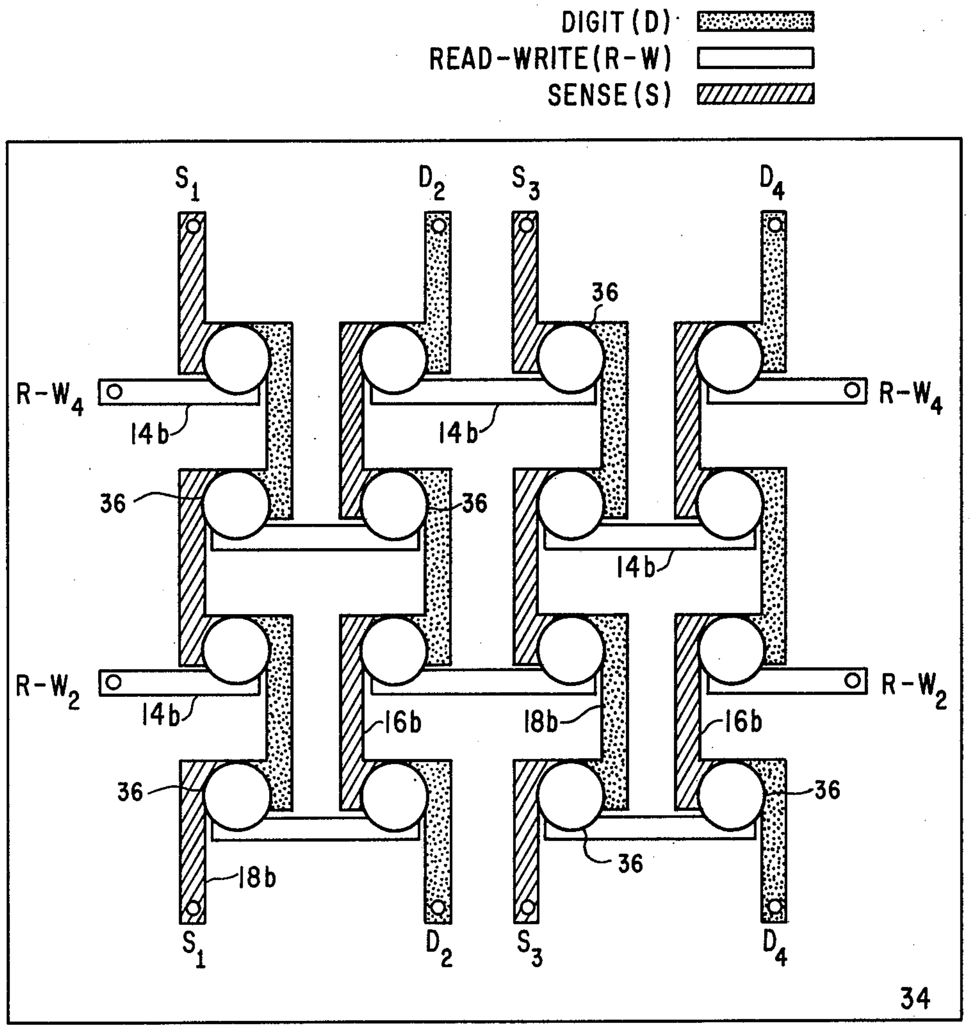

Other objects, features, and modifications of the invention will be apparent from the following more detailed description of one illustrative embodiment and reference to the accompanying drawings, wherein:

FIG. 1 is a representation of a linear selection magnetic core matrix representing the present state of the art in fabrication;

FIGS. 2*a* and 2*b* are partial view representations of circuit boards, pin and core embodying the invention;

FIG. 3 is a representation of one of two etched circuit boards with pins affixed, used in the invention; and, FIG. 4 is a representation of the other of two etched circuit boards used in the invention.

FIG. 1 shows a four by four magnetic core memory matrix of the linear selection type, which is illustrative of the present state of the art. The figure shows a matrix of cores 12 electrically interconnected with each other within each row by a read-write winding (R–W)14 and within each column by a digit winding (D)16 and a sense winding (S)18. This representative matrix is fabricated by connecting the cores of each row, representing a binary word, by threading a read-write winding 14 in an undulating pattern from left to right on FIG. 1 through the central openings of the cores. Left to right may be assumed to be the positive conducting direction. Thus, in the first and third bits of the second and fourth words, and in the second and fourth bits of the first and third words the read-write winding 14 threads down through a core 12; and, in the second and fourth bits of the second and fourth words, and in the first and third bits of the second and fourth words, it threads up through a core 12. The digit winding 16 is threaded from bottom to top of FIG. 1 (assuming that as the positive direction) also in an undulating pattern, so that in the first bit of the fourth word, for instance, the digit winding passes through the core 12 in the same direction as the read-write winding 14. Accordingly, when it is desirable to write a binary one into the first bit of the fourth word, and a binary zero into its second, third, and fourth bits, the read-write winding 14 for $word_4$ is pulsed in a positive direction (from left to right in FIG. 1), thereby conducting a half switching current to all of the bits in the fourth word. If the digit winding 16, for the first bit only, is also pulsed simultaneously in the positive direction, and the digit windings 16 for the second, third, and fourth bits are not pulsed, the first word in binary form will be 1000. As another example, if it were desired to write the following four words in the matrix: $Word_1$, 1010; $word_2$, 1001; $word_3$, 0101; $word_4$, 0000—read-write winding 14 for $word_1$ would be pulsed in the positive direction and digit winding 16 for bits one and three would be also pulsed in the positive direction; read-write winding 14 for $word_2$ would then be pulsed in the positive direction, and simultaneously digit winding 16 for bits one and four would be pulsed; read-write winding 14 for $word_3$ is then pulsed, together with digit windings 16 for bits two and four; and read-write winding 14 for $word_4$ is pulsed, and no digit winding is pulsed.

Reading is accomplished in the matrix shown in FIG. 1 by pulsing the read-write winding 14 of a particular word desired to be read with a full core-switching current in the negative, or opposite direction from the writing pulse, at which time all bits of the desired word will be carried to the output by the sense windings 18.

FIGS. 2*a* and 2*b* show the fabrication of a one core segment of the matrix embodying the invention. A pin 22 is affixed to an etched circuit board 20, on which appropriate read-write conductors $14_a$, digit conductors $16_a$ and sense conductors $18_a$ have been provided. The pin 22 is divided into three conducting segments, 24, 26, and 28, representing read-write, sense, and digit windings, respectively. These conducting segments 24, 26, and 28 are separate from each other by non-conducting segments 30 of the pin 22 and are connected by solder or other electric current conductive means to corresponding conductors $14_a$, $16_a$ and $18_a$. Another etched circuit board 34 is shown having a bevelled reception hole 36 and etched conductors $14_b$, $16_b$, and $18_b$ representing read-write, digit, and sense leads, respectively.

Fabrication of an assembly plane is accomplished by placing a toroid core 12 on segmented pin 22, affixed to circuit board 20. When the toroid core 12 is so mounted, a bevelled portion of the pin 22 remains protruding above the core 12. Circuit board 34 is then placed and affixed, by dip soldering or the like, so that the bevelled hole 36 conforms to the bevelled portion of the pin 22 protruding above the core 12. When the two etched circuit boards 20 and 34 are thus mated, the read-write conductor 14 will conduct (assuming left to right as postive direction) from its conducting segment $14_b$ on circuit board 34 through pin segment 24 and then to the segment of the read-write conductor $14_a$ on circuit board 20. Digit conductors 16 and sense conductors 18 will conduct between and through cores 12 in a direction similar to that shown in the hardware configuration of FIG. 1.

FIGS. 3 and 4 show the board 20 with pins 22 affixed and the board 34 with holes 36, respectively. A four by four printed matrix is shown in each figure substituting for the matrix of FIG. 1. Normally, as suggested previously, in a linear selection type memory matrix, the matrix itself is disposed among a multitude of planes rather than in one elongated plane. For instance, if a 4096 word matrix is desired with 38 bits per word, instead of having a matrix of 4096 rows with 38 columns, the matrix may be divided into 64 planes each having 64 rows and 38 columns of ferrite cores. In this type of matrix disposition, the invention is used as described above in each of the 64 planes, but connection is made between each plane by hand-wiring between sense and digit windings from one plane to another.

Another advantage of the fabrication technique embodying the invention is the minimization of self inductance of conductors $14_a$, $16_a$, $18_a$, between cores 12 on the plane 20 and non-hindrance of inductance as they go through the cores 12. If the plane 20 with the pins 22 mounted thereon is coated with pure copper on each side 38 and 40, the top side 38 could have its copper partially etched away to form conductors $14_a$, $16_a$, $18_a$, and the other side 40, its copper left intact as a ground. The shorter the distance between the etched conductors $14_a$, $16_a$, $18_a$, and ground, the smaller the mutual and self inductance; so the plate 20 can be made as thin as possible. Since flux is in a plane perpendicular to conduction, the conduction through cores 12 along pins 22, produces desired unhindered inductance. Furthermore, by printing intercore conductors 14, 16, 18, such techniques as noise cancellation, described in copending United States patent application S.N. 107,553, become more predictable, since etched wiring is fixed, whereas hand wiring moves and mutual and self inductance and noise cancellation are unpredictable.

In this manner, one illustrative embodiment of the invention ad modifications thereof provide a printed-circuit magnetic core matrix and fabrication technique wherein hand and machine wiring are eliminated. The invention is not, however, limited to memories only or to the specific embodiment and modifications shown and described, but may be employed with other types of switching matrices using, for example, coincident current techniques and embraces the full scope of the following claims.

What is claimed is:

1. A linear-selection ferrite-core memory system matrix comprising:
   (*a*) sense windings;
   (*b*) digit windings;
   (*c*) read-write windings;
   (*d*) two boards;
   (*e*) pins; and
   (*f*) ferrite cores having a toroid shape; wherein sense, digit, and read-write windings are all printed on two boards, disposed parallel to each other and connected by pins, which pins are affixed to each board in a matrix arrangement, and having the pins encircled by the ferrite cores and divided into conducting and non-conducting segments.

2. The invention according to claim 1 wherein interconnection between a number of memory system matrices is made by hand-wiring of digit and sense windings between matrices.

3. A magnetic core memory device comprising: first and second printed circuit boards disposed parallel to each other; a substantially cylindrical pin affixed at one end to said first circuit board with its axis perpendicular to the plane of the board, said pin having a bevelled edge at the other end and being comprised of axially disposed conductive segments, coextensive with the pin, and non-conductive segments; said second board having a bevelled hole therein receiving the bevelled end of said pin; a magnetic memory core encircling said pin and supporting said boards in spaced relation to each other; and printed circuit windings on said first and second boards selectively, electrically connected to the conductive segment of said pins.

4. The invention of claim 3 further including means on each of said boards for interconnecting said windings with the windings of other devices.

5. A magnetic core memory device comprising: first and second printed circuit boards disposed parallel to each other; a substantially cylindrical pin affixed at one end to said first circuit board with its axis perpendicular to the plane of the board, said pin being comprised of axially disposed conductive segments, coextensive with the pin, and non-conductive segments; said second board having a hole therein receiving the other end of said pin; a magnetic memory core encircling said pin and supporting said boards in spaced relation to each other; and printed circuit windings on said first and second boards selectively, electrically connected to the conductive segments of said pins.

References Cited in the file of this patent

UNITED STATES PATENTS

| | | |
|---|---|---|
| 2,823,360 | Jones | Feb. 11, 1958 |
| 2,824,294 | Saltz | Feb. 18, 1958 |
| 2,910,675 | Gessner | Oct. 27, 1959 |
| 2,970,296 | Horton | Jan. 31, 1961 |
| 2,985,948 | Peters | May 30, 1961 |
| 3,051,930 | Austen | Aug. 28, 1962 |

FOREIGN PATENTS

| | | |
|---|---|---|
| 874,275 | Great Britain | Aug. 2, 1961 |